US007720685B2

(12) United States Patent
Sakagami et al.

(10) Patent No.: US 7,720,685 B2
(45) Date of Patent: May 18, 2010

(54) RECEPTIONIST ROBOT SYSTEM

(75) Inventors: Yoshiaki Sakagami, Wako (JP);
Shinichi Matsunaga, Wako (JP); Nobuo Higaki, Wako (JP); Kazunori Kanai, Wako (JP); Naoaki Sumida, Wako (JP); Takahiro Oohashi, Wako (JP); Sachie Hashimoto, Wako (JP)

(73) Assignee: Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 1003 days.

(21) Appl. No.: 10/667,964

(22) Filed: Sep. 23, 2003

(65) Prior Publication Data

US 2004/0111273 A1   Jun. 10, 2004

(30) Foreign Application Priority Data

Sep. 24, 2002   (JP) .............................. 2002-277740

(51) Int. Cl.
*G10L 21/00* (2006.01)
*G06K 9/00* (2006.01)

(52) U.S. Cl. ........................... 704/277; 382/118; 901/1

(58) Field of Classification Search ................ 704/270, 704/277; 700/245; 901/1
See application file for complete search history.

(56) References Cited

U.S. PATENT DOCUMENTS

| 6,144,180 | A  | * | 11/2000 | Chen et al. | ................... | 318/587 |
| 6,584,375 | B2 | * | 6/2003  | Bancroft et al. | ............. | 700/213 |
| 6,584,376 | B1 | * | 6/2003  | Van Kommer | .............. | 700/245 |
| 7,058,577 | B2 | * | 6/2006  | Surace et al. | ................ | 704/270 |
| 2001/0021909 | A1 | * | 9/2001 | Shimomura et al. | .......... | 704/275 |
| 2002/0165790 | A1 | * | 11/2002 | Bancroft et al. | ................ | 705/26 |
| 2004/0104702 | A1 | * | 6/2004 | Nakadai et al. | ......... | 318/568.12 |

FOREIGN PATENT DOCUMENTS

JP          2-240684          9/1990

(Continued)

OTHER PUBLICATIONS

Hiroshi G. Okuno, et al., "Non-Verbal Eliza-like Human Behaviors in Human-Robot Interaction through Real-Time Auditory and Visual Multiple-talker Tracking", XP-002277080, The Third International Cognitive Robotics Workshop, Jul. 31, 2002, pp. 59-65, a total of 7 pages.

(Continued)

*Primary Examiner*—Angela A Armstrong
(74) *Attorney, Agent, or Firm*—Squire, Sanders & Dempsey, LLP

(57) ABSTRACT

To automate the work of recognizing a guest, check the appointment, notify a host of the arrival of the guest and conduct the guest to a designated place, a robot having a function to autonomously travel is equipped with camera/microphone for recognizing a guest at least according to image information. The system comprises management database adapted to communicate with the robot and equipped with an information database for identifying the recognized guest, and identifies the guest according to the information obtained from the camera/microphone and management database. The robot recognizes the guest from the image thereof, and the recognized guest is identified and verified by comparing the image of the visitor with the information contained in the database so that the robot can automatically conduct the guest to the designated meeting room according to the information of the appointment stored in the database.

23 Claims, 13 Drawing Sheets

FOREIGN PATENT DOCUMENTS

| | | |
|---|---|---|
| JP | 6-4559 | 1/1994 |
| JP | 7-234694 | 9/1995 |
| JP | 7-295637 | 11/1995 |
| JP | 07-295637 | 11/1995 |
| JP | 2001-202090 | 7/2001 |
| JP | 2002-56388 A | 2/2002 |
| JP | 2002-254372 | 9/2002 |
| KR | 2002-0015505 | 2/2002 |

OTHER PUBLICATIONS

Hiroshi G. Okuno, et al., "Social Interaction of Humanoid Robot Based on Audio-Visual Tracking", XP-002277079, Industrial and Engineering Applications of Artificial Intelligence and Expert Systems, Jun. 30, 2002, pp. 3-8, a total of 10 pages.

"Honda's Advanced Humanoid robot ASIMO", XP-002277081, http://www.world.honda.com/docs/2002/news, Feb. 14, 2002, a total of 2 pages.

"Honda's Humanoid robot ASIMO Rings Opening Bell at the NYSE", XP 002277082, http://www.world.honda.com/news/2002/c020, Feb. 15, 2002, a total of 1 page.

"Honda Introduces New ASIMO Humanoid Robot for Rental Business", XP-002277083, http://world.honda.com/news/2001/c011112, Nov. 12, 2001, a total of 2 pages.

* cited by examiner

RECEPTIONIST ROBOT SYSTEM

TECHNICAL FIELD

The present invention relates to a receptionist robot system.

BACKGROUND OF THE INVENTION

When a guest visit a host at corporate offices, typically, the guest tells a receptionist the purpose of the visit and the name of the host, and the receptionist has the guest wait in a designated waiting area while the host is summoned. The host then comes to the waiting area, informs the receptionist of his arrival, and conducts the guest to a prescribed conference room or drawing room. If the conference room was designated in advance, it is inefficient for the host to come to the waiting area. However, if the receptionist is assigned with the duty to conduct the guest to the designated conference room, the receptionist would be overburdened. If another person is assigned with the duty to conduct guests to conference rooms, not only the labor cost rises but also it creates additional work of sharing information because this person needs to inquire the receptionist and guest of information on the purpose of the visit and the designated conference room.

When the receptionist intends to summon the host, the receptionist looks up a directory or database to find the telephone extension number under the name or post of the host, and communicates with the host. The receptionist is required to repeat this process for each guest, and the work efficiency may be highly poor depending on the skill or method of the receptionist. The guest may identify the host by saying "Mr. AA at extension number XXXX" or "Mr. BB in YYYY division". In such a case, the extension number or his post may be outdated, and this may hamper prompt summoning of the host.

It has been proposed to automate the work of receiving and conducting a guest without depending on human efforts. See Japanese Patent Laid-Open (Kokai) Publications Nos. 2-240684 (line 8, lower left column, page 2-line 15, lower right column, page 2, and FIG. 4) and 7-295637 (paragraph [0012], and FIG. 3), for instance). However, according to the proposal disclosed in Japanese Patent Laid-Open (Kokai) Publication 2-240684, use is made of a robot which conducts a guest by using speech and image, and travels along a magnetic induction wire. Therefore, if any obstacle is placed on the magnetic induction line, the robot is unable to return to the initial position. According to the proposal disclosed in Japanese Patent Laid-Open (Kokai) Publication 7-295637, a guide robot can be connected to an external control unit, but is unable to conduct the guest because the robot is not capable of a guided motion.

According to the conventional robots, only the function of either a receptionist or a conductor is available, and the robot is assigned to perform a duty in a way a human would usually perform. Therefore, the robot is unable to perform the comprehensive actions of receiving and conducting a guest, and a desired level of efficiency in receiving and conducting a guest cannot be attained.

BRIEF SUMMARY OF THE INVENTION

In view of such problems of the prior art, a primary object of the present invention is to successfully automate the work of recognizing a guest, check the appointment, notify a host of the arrival of the guest and conduct the guest to a designated place in the work of receiving guests at corporate offices.

At least part of such an object can be accomplished by the receptionist robot system of the present invention, comprising: a traveling robot (2) including autonomous traveling means (2a) for traveling autonomously and external recognition means (11, 14) for recognizing a guest (9) at least according to image information; and management database means (3) adapted to communicate with the robot (2) and provided with a database containing identification information to identify the guest recognized by the external recognition means (11, 14); wherein the guest is identified at least according to the information obtained by the external recognition means and management database (3).

According to this arrangement, the guest can be visually recognized by the traveling robot, and can be identified by comparing the visually recognized guest with information in the database. Therefore, if this appointment is properly recorded in the database, the traveling robot can automatically and directly conduct the guest to the designated conference room according to such information.

If the traveling robot (2) is provided with dialog means (12, 13, 14) for communicating with the guest (9) recognized by the external recognition means (11, 14), the robot can deal with the guest by dialog. In particular, if the traveling robot (2) is provided with response means (14) for determining the contents of communication with the guest according to the information from the management database means (3), it can deal with the guest even more appropriately.

If the management database means (3) is adapted to retain and update individual personal information and schedule information, it is always possible to deal with the situation according to the most updated, correct information. In particular, if the management database means (3) is adapted to update the individual personal information according to a result of communication with the guest (9) conducted by the response means (14), the new information of the guest can be updated most promptly.

If the external recognition means (11, 14) is adapted to select a candidate or determine a priority order of a plurality of candidates according to the schedule information of the management database means (3), the time required for the recognition process can be minimized, and the robot can deal with the guests in the order of the time of each appointment.

Alternatively, the present invention comprises a receptionist robot system, comprising: a traveling robot (2) adapted to travel autonomously; and management database means (3) adapted to communicate with the robot (2) and provided with a database adapted to retain and update individual personal information and schedule information for identifying a guest (9); wherein the traveling robot (2) comprises external recognition means (11, 14) for recognizing the guest (9) at least according to image information, and response means (14d) for determining an action to conduct the guest recognized by the external recognition means (11, 14); the management database (3) being communicably connected with input means (PC1, PC2, PC3) for inputting the schedule information and notification means (PC1, PC2, PC3) for notifying the arrival of the guest (9) to a host according to the action of the response means with respect to the guest (9).

According to this arrangement, when the traveling robot has recognized the guest, by conducting the guest to a designated place while notifying the host of the arrival of the guest, the host can attend to the meeting without any delay. The host can input schedule information into the management database means via input means so that the most updated and accurate schedule information may be maintained in the database.

If the external recognition means (11, 14) is adapted to forward a recognition result to the management database (3), and the management database (3) is adapted to update the individual personal information according to the forwarded recognition result, the most updated individual personal information of the guests can be maintained in the database.

If the management database (3) comprises map information including at least a position of a stairway, and the traveling robot (2) is capable of traveling inside a building including a stairway according to the map information, the robot is allowed to move about not only on a single plane but also in a building having stairways according to the map information, and can operate without any problem even when waiting rooms or the like are located on upper levels of the building.

If the management database means (3) is adapted to retain and update a utilization status of a facility located within a traveling range of the robot (2), the robot is enable to identify the availability of the facility. In particular, if the response means (14d) is adapted to determine an action to conduct the guest (9) according to the utilization status of the facility, the robot is enable, for instance, to conduct the guest to a vacant conference room, and deal with changing situations.

If the management database means (3) is adapted to retain and update the individual personal information of the guest (9), the database of the guests can be kept updated at all times. If the management database means (3) or robot (2) is provided with an answer-back function in connection with the notification means (PC1, PC2, PC3), it becomes possible to verify if the recipient of the notification has indeed received the notification, and avoid any inadvertent failure to notify the host. The robot may change the way to deal with the guest depending on the contents of the confirmation from the host.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
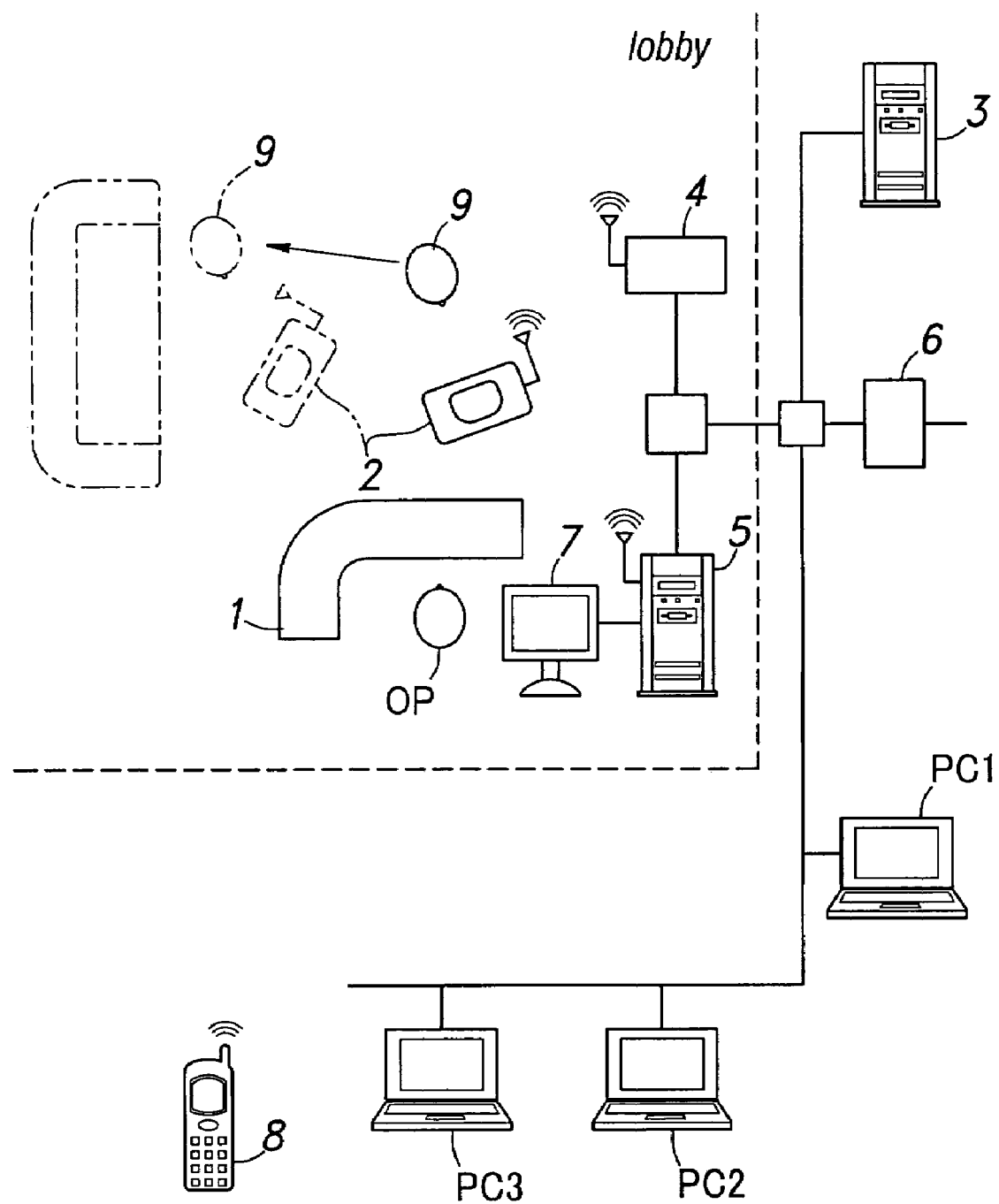
FIG. 1 is an overall structural view of a receptionist robot system embodying the present invention.

FIG. 1 is an overall structural view of a receptionist robot system embodying the present invention. As shown in the drawing, a robot main body 2 is placed next to a reception counter 1 of a lobby, and an operator OP is seated behind the reception counter 1. The operator OP may also be situated in another room. A database server 3 serving as management database means that can communicate with the robot main body 2 is placed in a room separate from the lobby, and is provided with a LAN connection with a wireless router 4 placed in the lobby. The database server 3 is also provided with a LAN connection with a robot support server 5 serving as monitoring means, an internet adapter 6 and personal computers PC1, PC2, PC3, . . . serving as notification means. The personal computers PC1, PC2, PC3, . . . can be used for entering schedule information and displaying the arrival of a guest.

The robot support server 5 is capable of a wireless communication with the robot main body 2 to support the exchange of information between the robot main body 2 and database server 3, and may be additionally provided with an individual personal information database, an appointment system, a global map, a notification function and a monitoring tool. A monitor 7 is connected to the robot support server 5 to enable the operator OP to monitor the status of the robot main body 2 and database server 3.

The LAN is also accessible from a portable terminal 8. Thereby, a host (not shown in the drawing) scheduled to meet a guest 9 can be notified of the arrival of the guest 9 from the portable terminal 8 even when he is away from his own personal computer.

Figure 2:
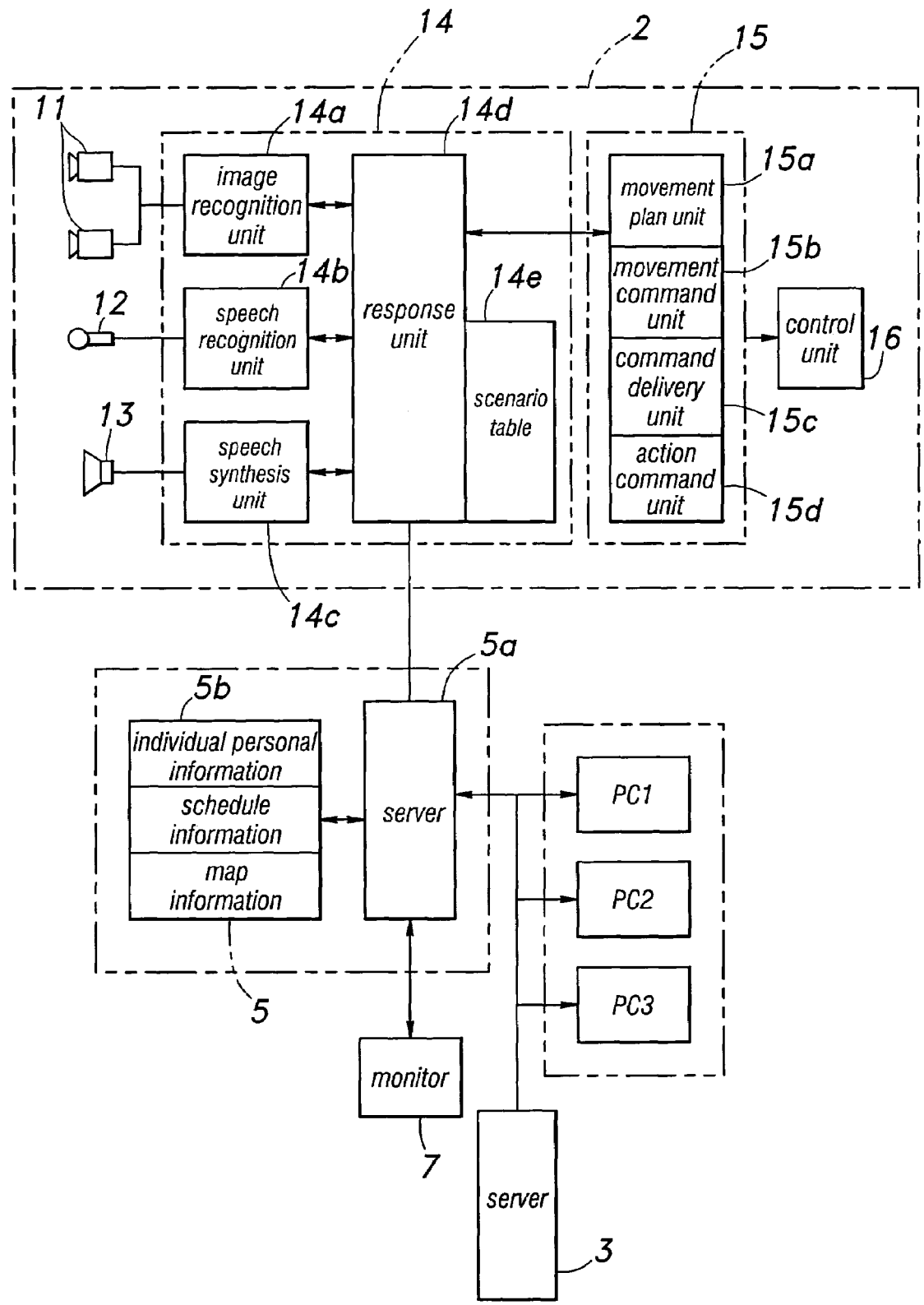
FIG. 2 is a simplified diagram of the receptionist robot system.

FIG. 2 is a simplified block diagram of the receptionist robot system embodying the present invention. The robot main body 2 is provided with a pair of cameras 11 provided on either side thereof, a microphone 12 and a loudspeaker 13. The robot main body 2 is additionally provided with a recognition module 14 serving as an external recognition means, an action module 15 and a control unit 16. The recognition module 14 comprises an image recognition unit 14a, a speech recognition unit 14b connected to the microphone 12, a speech synthesis unit 14c connected to the loudspeaker 13, and a response unit 14d for exchanging signals with these units. The action module 15 comprises a movement plan unit 15a, a movement command unit 15b, a command delivery unit 15c, and an action command unit 15d, and transmits control signals generated by these units to the control unit 16.

The image recognition unit 14a three-dimensionally visualizes an image by using the pair of cameras 11, generates a local map of a range of movement from this image, detects a moving object (moving body) within the image, detects a face portion of the moving object, and identifies the face portion as such, by making use of an image processing process. The speech recognition unit 14b locates the source of the speech and recognizes the speech by making use of a speech processing process according to the speech data obtained from the microphone 12. The speech synthesis unit 14c synthesizes a speech that is designed to be delivered from the loudspeaker 13 according to a command from the response unit 14d by making use of a speech processing process.

The response unit 14d is provided with a scenario table 14e which includes a individual personal map and a scenario management unit. The individual personal map manages the human information (that would allow the operator OP and guest 9 to be distinguished apart) surrounding the robot main body 2 according to the information of the image processing, sound source location and speech processing. The scenario management unit looks up the scenario table 14e which defines various actions of the robot main body 2 when communicating with a human, and controls and manages the actions that are to be executed depending on each particular condition.

The robot support server 5 comprises a server main body 5a and a database unit 5b. The server main body 5a communicates with the response unit 14d, and is provided with a LAN connection with the personal computers PC1, PC2, PC3, . . . serving as communication terminals. A monitor 7 and an input terminal not shown in the drawing are connected to the server main body 5a. The database unit 5b stores individual personal information, schedule information and map information as respective databases. Such information can be renewed or updated by accessing the databases from outside. The map information (global map) includes information on the corridors, stairways and rooms within the range of the travel or movement of the robot main body 2. The robot main body 2 can walk about freely within this range according to such map information.

The information stored in the individual personal information of the database unit 5b may include general information which may include such items as ID number, name, how the name is pronounced, name in Roman letters, nickname, sex, date of birth and blood type, work information which may include such items as company, department, post, telephone number, mail address and terminal information, log information which may include records of past receptions or visits, and management information such as the number of recorded images. The same information is also stored in the database server 3. The database server 3 additionally stores appointment information, a global map and language information.

Figure 3:
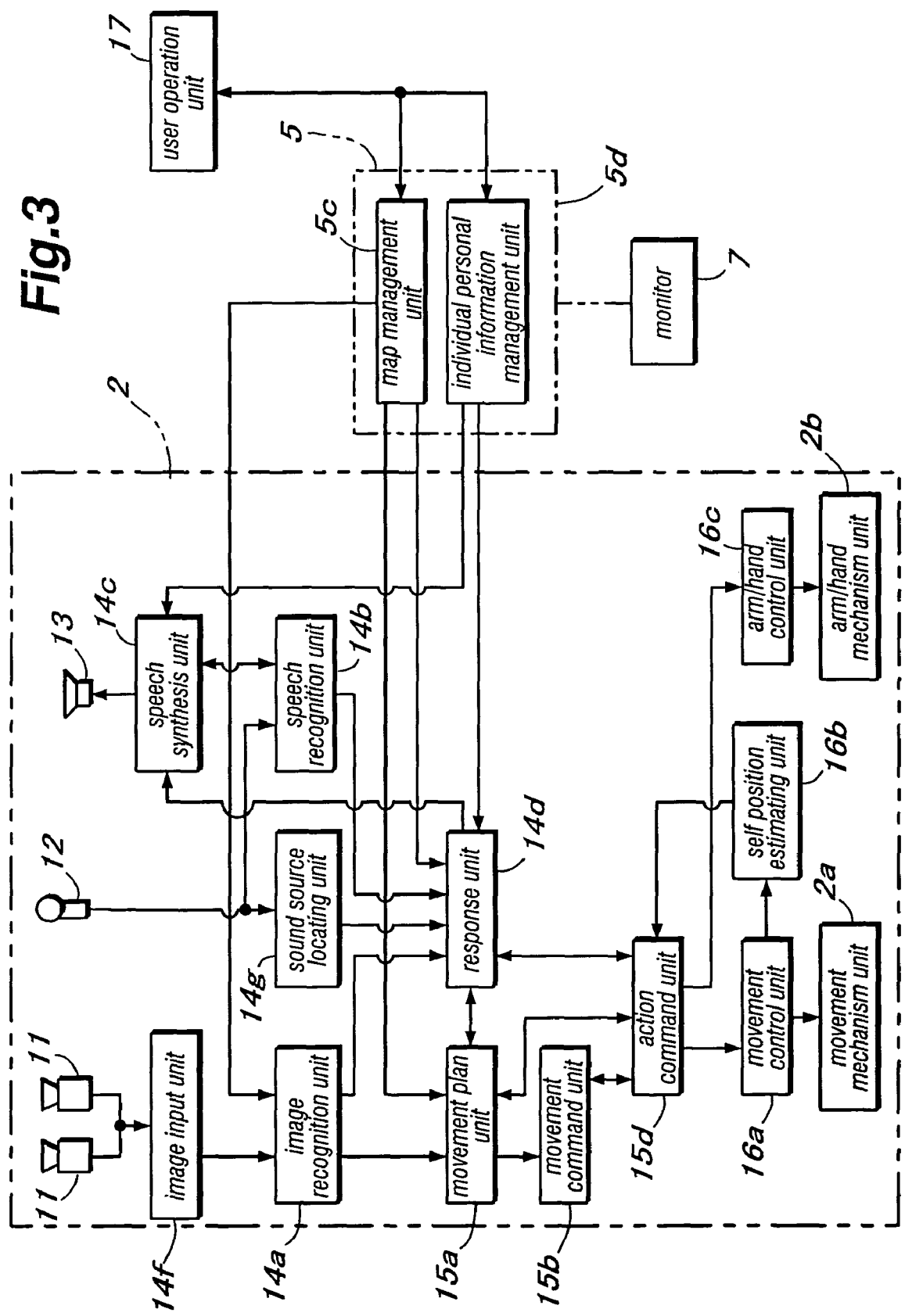
FIG. 3 is a system block diagram of the robot main body 2.

The system of the robot main body 2 is now described in the following with reference to the block diagram of FIG. 3. The robot main body 2 comprises the cameras 11, microphone 12 and loudspeaker 13 as mentioned earlier. The image signal from the cameras 11 is forwarded to an image recognition unit 14a via an image input unit 14f, and the audio signal from the microphone 12 is forwarded to a sound source locating unit 14g and a speech recognition unit 14b. The speech synthesized by the speech synthesis unit 14c is forwarded to the loudspeaker 13. The speech signal from the speech synthesis unit 14c is forwarded to the speech recognition unit 14b while the speech recognition signal from the speech recognition unit 14b is forwarded to the speech synthesis unit 14c.

The cameras 11 may be either a monochromatic or color camera, and may consist of either regular or stereoscopic cameras. The cameras can both pan (lateral motion) and tilt (vertical motion) by using electric motors. The image input unit 14f captures a digitized image by using a frame grabber, and extracts movement information from a difference between a pair of consecutive or arbitrarily selected frames. The image recognition unit 14a obtains distance information from the image, and determines the profile of a human or the position of a moving object according to an optical flow. In this case, the position can be determined by extracting a region of a particular color by using color information and referring to the distance information.

The sound source locating unit 14g may be provided with stereophonic microphones 12 so as to be capable of locating a sound source from the difference of the sound pressure and arrival time between the two microphones. Also, from the rise in the sound wave, it is determined if the sound is a human speech or an impulsive sound. The speech recognition unit 14b looks up a vocabulary list which is prepared in advance, and recognizes human speech commands and intensions by recognizing the speech signals from the microphones 12. The speech synthesis unit 14c produces a speech signal according to the command from the response unit 14d or a result of speech recognition conducted internally in the speech synthesis unit 14c.

The system further comprises a sight line control unit which directs the cameras in a desired direction. The sight line control unit converts the position information of the object captured by the image recognition unit 14a into pan and tilt angles. These values are forwarded to a camera motion control unit (not shown in the drawing), and the line of sight can be fixed to an object by controlling the pan and tilt angles of the cameras 11 according to the control signal from the camera motion control unit. By inputting the kind of sound (speech or impulsive sound) and the location of the sound source obtained by the sound source locating unit, the cameras (line of sight) may be directed toward the sound source. By inputting the pan and tilt angle values from the movement plan unit 15a or response unit 14d to the sight line control unit, the cameras (line of sight) can be directed to a desired location.

The image recognition unit 14a receives the map information stored in the map management unit (global map) 5c provided in the database unit 5b of the robot support server 5. The image recognition unit 14a is adapted to identify a human face by looking up the face database stored in the individual personal information management unit 5d. The image output from the image recognition unit 14a, as well as the map information from the map management unit 5c, is forwarded to the movement plan unit 15a and response unit 14d.

The map management unit 5c stores the map of the surrounding area, and the preset routes and tasks of the robot main body 2. The individual personal information management unit 5d stores an individual personal information database and a database for face recognition.

The movement plan unit 15a and response unit 14d exchange signals between them. The movement plan signal from the movement plan unit 15a is forwarded to the movement command unit 15b. The movement plan unit 15a also receives an action command signal from the action command unit 15d. The action command unit 15d receives a command signal from the response unit 14d, and exchanges signals with the movement command unit 15b.

The movement plan unit 15a allows the robot main body 2 to approach an object (human or fixture) while fixing the line of sight directed thereto. The movement route is determined by a route generating process, and is commanded to the robot main body 2. In this case, the movement command route is such that the relative angle between the target point and the robot is reduced to zero. The arrival at the target point is determined by the information from a gyro (not shown in the drawing). If there is any task information received from the map management unit 5c, a startup command is forwarded to the image recognition unit 14a to determine the position of an object as a part of the task. The gyro may consist of a geomagnetic sensor, a position adjustment system using a gas rate sensor or other position adjustment systems incorporated with GPS or the like.

The system further comprises a walk command unit (not shown in the drawing) which converts walk command values obtained from the movement plan unit 15a into a movement command of the robot main body 2, and transfers incremental command values to the movement command unit 15b. The result of image recognition is directly forwarded to the walk command unit so that the robot main body 2 may be informed of the obstacles that may be present around the robot main body 2 and is prevented from colliding with such obstacles while in movement.

The movement command unit 15d forwards movement commands to the control unit 16 according to the sight line command values, walk command values and action command values from the response unit 14d that are given asynchronously. The current position of the robot main body 2 is forwarded to the movement plan unit 15a and walk command unit.

The response unit 14d receives a sound source locating signal from the sound source locating unit 14g, a speech recognition signal from the speech recognition unit 14b and the individual personal information (schedule information and information for face recognition) stored in the individual personal information management unit 5d provided in the database unit 5b of the robot support server 5.

The control unit 16 of the robot main body 2 comprises a movement control unit 16a, a self position estimating unit 16b and an arm/hand control unit 16c, and the drive unit of the robot main body 2 comprises a movement mechanism unit 2a serving as an autonomous movement means and an arm/hand mechanism unit 2b.

The self position estimating unit 16b estimates the traversed distance and direction of the current movement from the detected values of the gyro and angles of the articulated parts of the robot main body 2, and passes this information to the movement plan unit 15a via the action command unit 15d. The incremental command from the walk command unit may consist of a rotational angle of the wheels in case of a wheeled robot main body or a step in case of a bipedal robot main body, and a signal controlling the movement mechanism unit 2a is forwarded to the movement control unit 16a via the action command unit 15d according to this incremental command. The movement mechanism unit 2a may be those using wheels, legs or crawlers. The arm/hand control unit 16c moves the hands and arms or other actuators according to the command from the action command unit 15d. The arm/hand mechanism unit 2b consists of hands and arms or other actuators.

The action command signal from the action command unit 15d is forwarded to the movement control unit 16a and arm/hand control unit 16c. The movement control signal from the movement control unit 16a is forwarded to the movement mechanism unit 2a, and the robot main body 2 can operate on account of the actuation of the movement mechanism unit 2a. The hand/arm control signal from the arm/hand control unit 16c is forward to the arm/hand mechanism unit 2b, and arms and hands (not shown in the drawing) of the robot main body 2 are actuated on account of the operation of the arm/hand mechanism unit 2b.

A user operation unit (such as a keyboard or touch panel) 17 exchanges signals with the map management unit 5c and individual personal information management unit 5d, and entry of new information and updating existing information can be effected from the user operation unit 17. The user operation unit 17 servers as a user interface for commanding the start and end of the movement, as well as the returning to the original position, of the robot main body 2.

Figure 4:
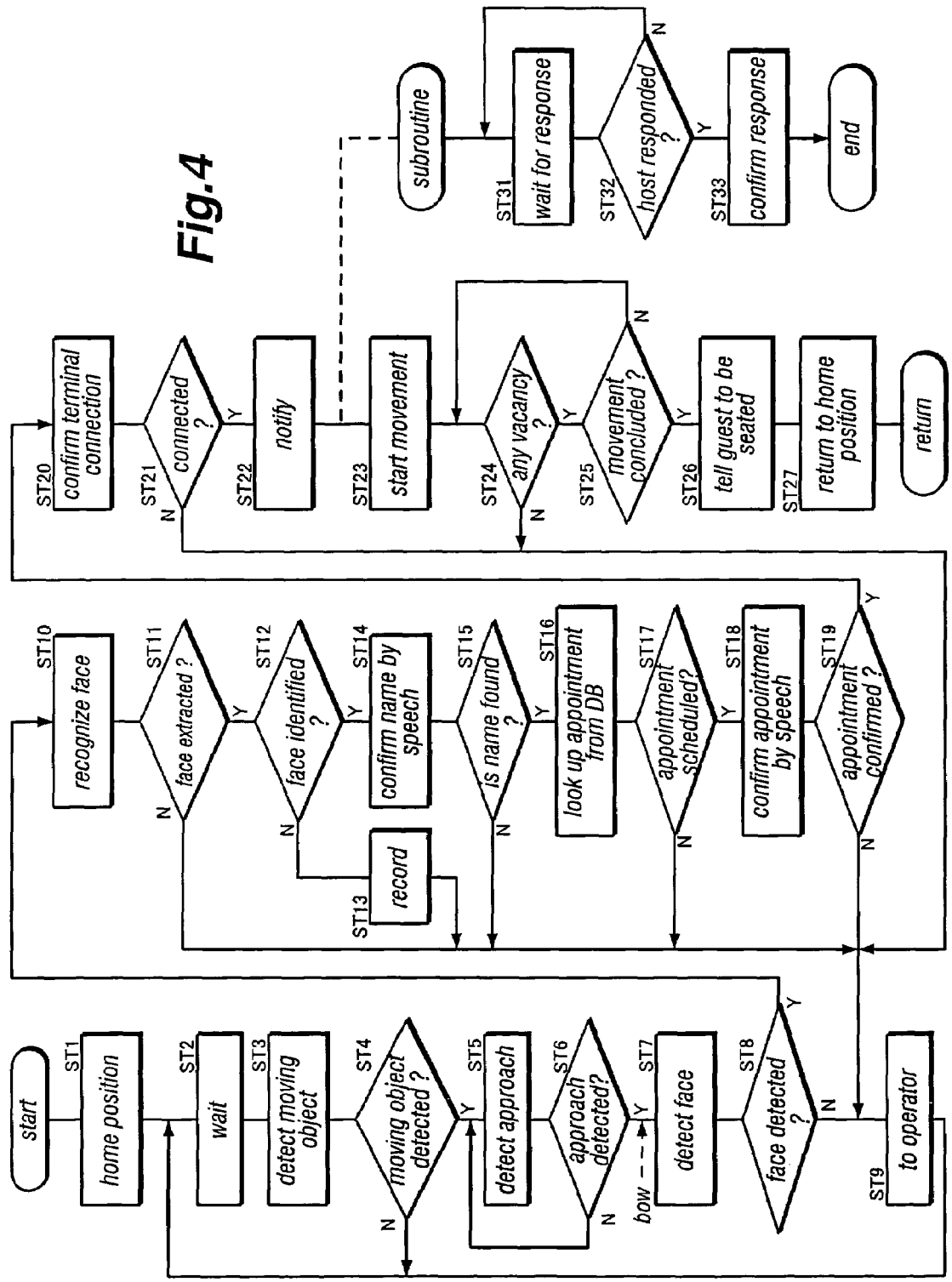
FIG. 4 is a flowchart showing the mode of receiving and conducting a guest.

The mode of operation of the receptionist robot system of this embodiment is described in the following. First of all, the case of the robot main body 2 operating as a receptionist is described in the following with reference to the flowchart shown in FIG. 4. The home position is defined in step ST1. The home position may be defined at a position adjacent to the reception counter 1 shown in FIG. 1, and the robot main body 2 is made to stand at this position. The robot main body 2 proceeds to a wait state at the home position in step ST2, and directs the body and cameras 11 toward a point (such as an entrance door), for instance, from which a guest 9 is expected.

The robot main body 2 then proceeds to a moving body detection mode in step ST3, and conducts an image processing process for recognizing a moving object contained in the image captured by the cameras 11. In the flow process for a receptionist, an erroneous response to minor movements can be avoided by setting a threshold level in detecting a moving object at a level suitable for detecting a human being. It is determined in step ST4 if a moving object has been detected. If not, the program flow returns to step ST3 to repeat the preceding steps. If a moving object has been detected, the program flow advances to step ST5.

An approach detecting mode is executed in step ST5 to detect the approach of a moving object (guest 9) to a prescribed distance, and the program flow advances to step ST6. It is determined in step ST6 if the moving object has approached (to the prescribed distance). If not, the program flow returns to step ST5, and repeats the step of detecting an approach of the moving object. The approach of a moving object can be detected by comparing the positions of the same moving object in consecutive frames, and determining the approach of the moving object if the distance of the object to the cameras 11 diminishes and the angle of the line connecting the cameras 11 and gravitational center of the object stays below a prescribed threshold level for a prescribed number of consecutive frames.

When an approach is detected in step ST6, the program flow advances to step ST7 where the detection of a face is executed by the image recognition unit. The robot main body 2 may be programmed to bow to the approaching guest 9 as an additional action preceding step ST7.

It is determined in step ST8 if the face of the guest 9 has been detected. If not, the program flow advances to step ST9, and the robot main body 2 tells the guest "Excuse me. Please speak to the operator" by using the speech synthesis unit before the program flow returns to step ST2. If a face has been detected in step ST8, the program flow advances to step ST10 where the image recognition unit recognizes the face. It is determined in step ST11 if the face was successfully extracted. If not, the program flow advances to step ST9. If the face was successfully extracted, the program flow advances to step ST12.

It is determined in step ST12 if the face extracted in step ST11 can be identified. This can be accomplished by forwarding the image of the extracted face to the database server, and comparing the image with any of the face information stored in the database unit as individual personal information. If the extracted face cannot be identified, the program flow advances to step ST13 where the image data of the extracted face is recorded in the database unit as individual personal information before the program flow advances to step ST9. If the extracted face can be identified, the program flow advances to step ST14.

In step ST14, the robot main body 2 speaks to the guest, "May I have your name, please?" or "Are you Mr. XXX?", and recognizes the name of the guest by using the speech recognition unit before the program flow advances to step ST15. In step ST15, it is determined if the recognized name agrees with the name under which the individual personal information corresponding to the recognized face is recorded. If no matching name is found, the program flow advances to step ST9. Otherwise or if a matching name is found, the program flow advances to step ST16.

In step ST16, the robot main body 2 inquires the contents of the appointment of the particular guest 9. More specifically, such pieces of information as the time of visit, name, company and host are looked up from the database unit according to the individual personal information of the guest 9. It is determined in step ST17 if the appointments recorded in the schedule information of the database unit include any that matches the appointment of the guest 9. If not, the program flow advances to step ST9. If such an appointment is anticipated, the program flow advances to step ST18. In step ST18, the robot main body 2 speaks to the guest, "Do you have an appointment to see Mr. XXX in a conference room #YYY at ZZ pm?", and recognizes the reply of the guest 9 by using the speech recognition unit before the program flow advances to step ST19.

In step ST19, it is determined if the reply of the guest 9 is "yes" or "no". If "yes", the program flow advances to step ST9. If "no", the program flow advances to step ST20. In step ST20, the connection with the notification terminal is confirmed. The confirmation of the connection with the notification terminal consists of the steps of looking up notification terminal information (such as IP address) from the individual personal information recorded in the database unit of the host who is required to be notified, and establishing the connection with the notification terminal prior to the notification of the appointment to the host. In step ST21, it is determined if the above mentioned connection is possible. If the connection is not possible, the program flow advances to step ST9. If the connection is possible, the program flow advances to step ST22.

In step ST22, the name and other information of the guest 9 is notified to the notification terminal of the host. The program flow then advances to step ST23 and a response process is initiated for the host as an interrupt routine. As a subroutine of this interrupt routine, a response wait state for waiting a response from the host is produced in step ST31, and it is determined in step ST32 if there has been any response from the host. When no response is received from the host, the program flow returns to step ST31. When a response is received from the host, the program flow advances to step ST33 where the guest 9 is notified by a speech that a response regarding the appointment has been received from the host before the subroutine is concluded.

In step ST23 of the main routine, the robot main body 2 moves toward a sofa while taking a posture to lead the way for the guest 9 to have him wait in the sofa until the host comes to the lobby to meet the guest 9. In step ST24, it is determined if there is any vacancy in the sofa. If there is no vacancy, the program flow advances to step ST9. If there is a vacancy, the program flow advances to step ST25 where it determined if the trip to the sofa has completed. If the trip to the sofa has not completed, the program flow returns to step ST24. If the trip to the sofa has completed, the program flow advances to step ST26 where the guest 9 is notified by a speech to be seated in the sofa. In step ST27, the return process is executed and the robot main body 2 starts moving back toward the home position before the main flow is concluded.

It is also possible for the host who has been notified of the arrival of the guest to reply by using a personal computer or mobile telephone, and to provide instructions for the robot main body 2. For instance, the host may instruct the robot main body 2 to "wait in the lobby", "conduct the guest to a prescribed meeting place" or "change the speech to the guest".

Figure 5:
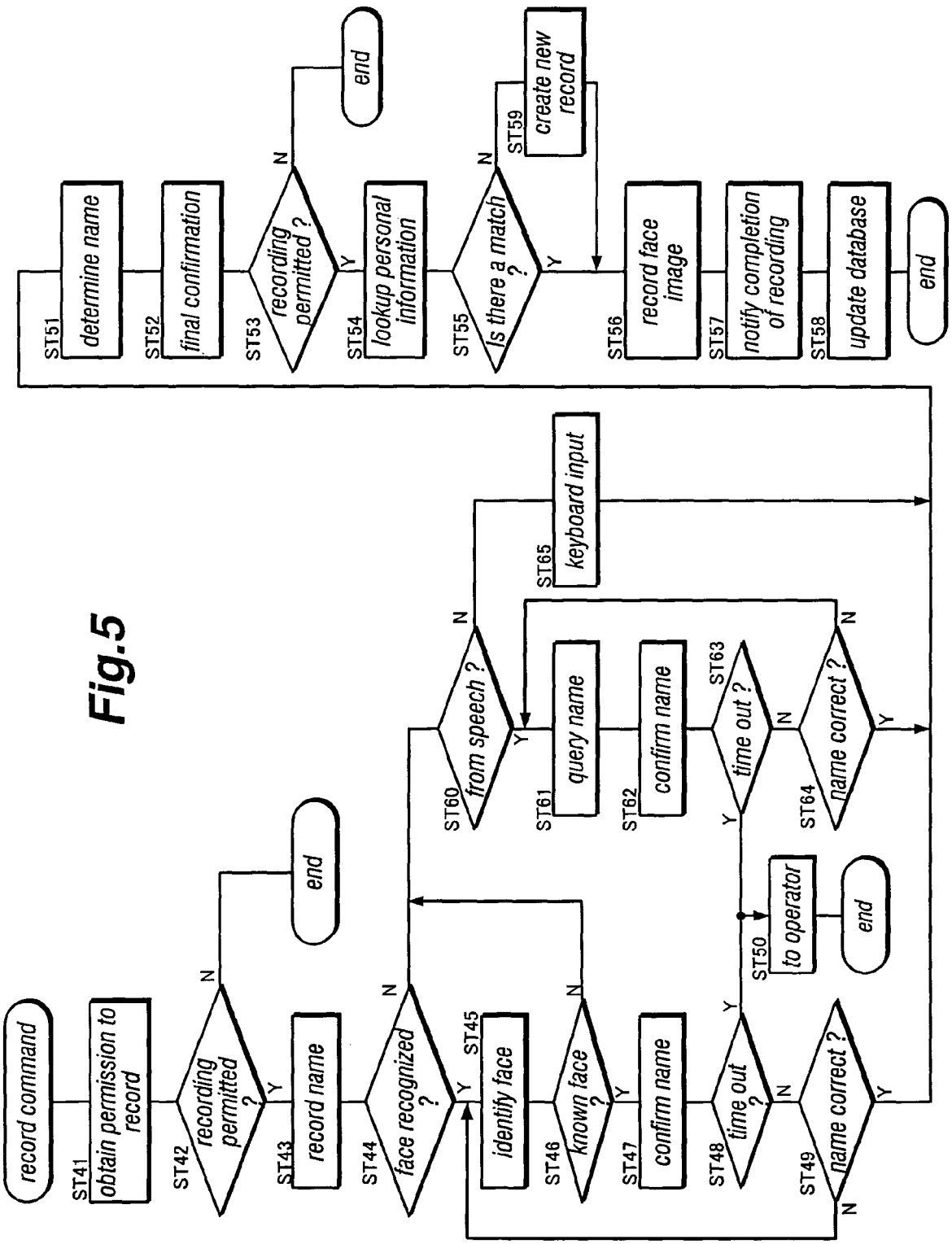
FIG. 5 is a flowchart showing the mode of recording individual personal information.

The recording of individual personal information is described mainly in connection with the robot main body 2 with reference to the flowchart of FIG. 5. The flow of the recording individual personal information is started by a record command made by the operator. The command may be in the form of a speech (such as "record") by the operator or a keyboard input from the robot support server. It is confirmed in step ST41 if a recording process has indeed been permitted by querying in speech, "May I record your face?", and it is determined in step ST42 if the recording may proceed. In this determination step, for instance, the reply from the object of recording in speech is recognized by the speech recognition unit, and it is confirmed that the recording is permitted.

If it is determined in step ST42 that the recording is not permitted from the contents of the reply, the main flow is concluded. If the recording is permitted, the program flow advances to step ST43 where the guest is notified that the name will be recorded. It is determined in step ST44 if the face was recognized from the result of face recognition in step ST12. If the face was recognized, the program flow advances to step ST45 where the face is recognized again before the program flow advances to step ST46. In step ST46, it is determined if the result of face recognition matches with any in the database or not. If the face is recognized to be a known face, the program flow advances to step ST47 where the name corresponding to the known face is read out from the database and the robot main body 2 confirms it by-speaking "May the image of Mr. xxx be updated?".

In step ST48, it is determined if a prescribed time period has elapsed. This time period may start at step ST45. If it is determined in step ST48 that the prescribed time period has not elapsed (no time out), the program flow advances to step ST49 where the guest's reply regarding the confirmation of his name is recognized by the speech recognition unit, and it is determined if the confirmed name was correct. If the name was not correct, the program flow returns to step ST45 and repeat the face recognition and query/confirmation of the name. If the prescribed time has elapsed without confirming a correct name, and a time out is detected in step ST48, the program flow advances to step ST50 where the robot main body 2 speaks, "Excuse me. Please, speak with the operator." before concluding the main flow. Step ST50 may include a step of delivering a message entered from a keyboard.

If it is determined that the name confirmed in step ST49 is correct, the program flow advances to step ST51 where it is determined that the confirmed name is indeed correct before the program flow advances to step ST52. In step ST52, a query is made by speaking, "May I go ahead with the recording?" as a last step of confirming the recording before the program flow advances to step ST53. In step ST53, the reply from the guest in response to the final confirmation in step ST52 is recognized by the speech recognition unit, and it is determined the name should be recorded. If the name should not be recorded, the main flow is concluded. If the name should be recorded, the program flow advances to step ST54.

In step ST54, the confirmed name is looked up from the individual personal information of the database unit before the program flow advances to step ST55. In step ST55, it is determined if the data of the person identified in step ST54 exists. If the data of this person exists, the program flow advances to step ST56. If not, the program flow advances to step ST59 where a new record of data for this person is created before the program flow advances to step ST56. The image of the face of this person is recorded in step ST56. By thus recording the image of the face without regard if the person is known or not, it is possible to record the most current face image at all times. When the recording of the face image in step ST56 is concluded, the program flow advances to step ST57 where the completion of the recording is notified by speech, for instance, by saying "The recording is complete."

before the program flow advances to step ST58. In step ST58, the contents of the database such as the face image and name are updated before concluding the main flow.

If the face could not be successfully recognized in step ST44, the program flow advances to step ST60. Also, if the result of face recognition does not match with any known face in step ST46, a query is made, for instance, by saying "Is this a new record?" before the program flow advances to step ST60. In step ST60, it is determined if the input of the name should be made by a speech. This determination may be based on if the speech can be recognized for the purpose of recording the name. If it is possible, the program flow advances to step ST61 where a query is made, for instance, by saying, "May I have your name, please?". The reply to this is then recognized by the speech recognition unit in step ST62 before the program flow advances to step ST63. In step ST63, a time out process similar to that of step ST48 is executed. If a time out occurs without confirming the name, the program flow advances to step ST50. It a time out has not occurred, the program flow advances to step ST64 where it is determined if the name is correct similarly as in step ST49. If it is determined in step ST62 that the confirmed name is correct, the program flow advances to step ST51 and the aforementioned process is executed. If it is determined that the confirmed name is not correct, the program flow returns to step ST61.

If it is determined in step ST60 that the name should not be recorded from the speech, the program flow advances to step ST65. In step ST65, it is notified that the name should be entered from the keyboard, and the entered name is recognized before the program flow advances to step ST51. Entry from the keyboard may be substituted by the use of a business card reader incorporated with a character recognition function. By thus conducting the recording of a face image based on the result of face recognition, recording of a name by speech or recording of a name by entry from a keyboard, the recording can be effected without any omissions. When the name is recorded from the result of face recognition, because the accuracy of the data is confirmed by comparing it with known data, it is possible to avoid the recording of a same person twice. Also, because the data based on face recognition and name are both recorded, it is possible to tell apart two persons having a same name.

Figure 6:
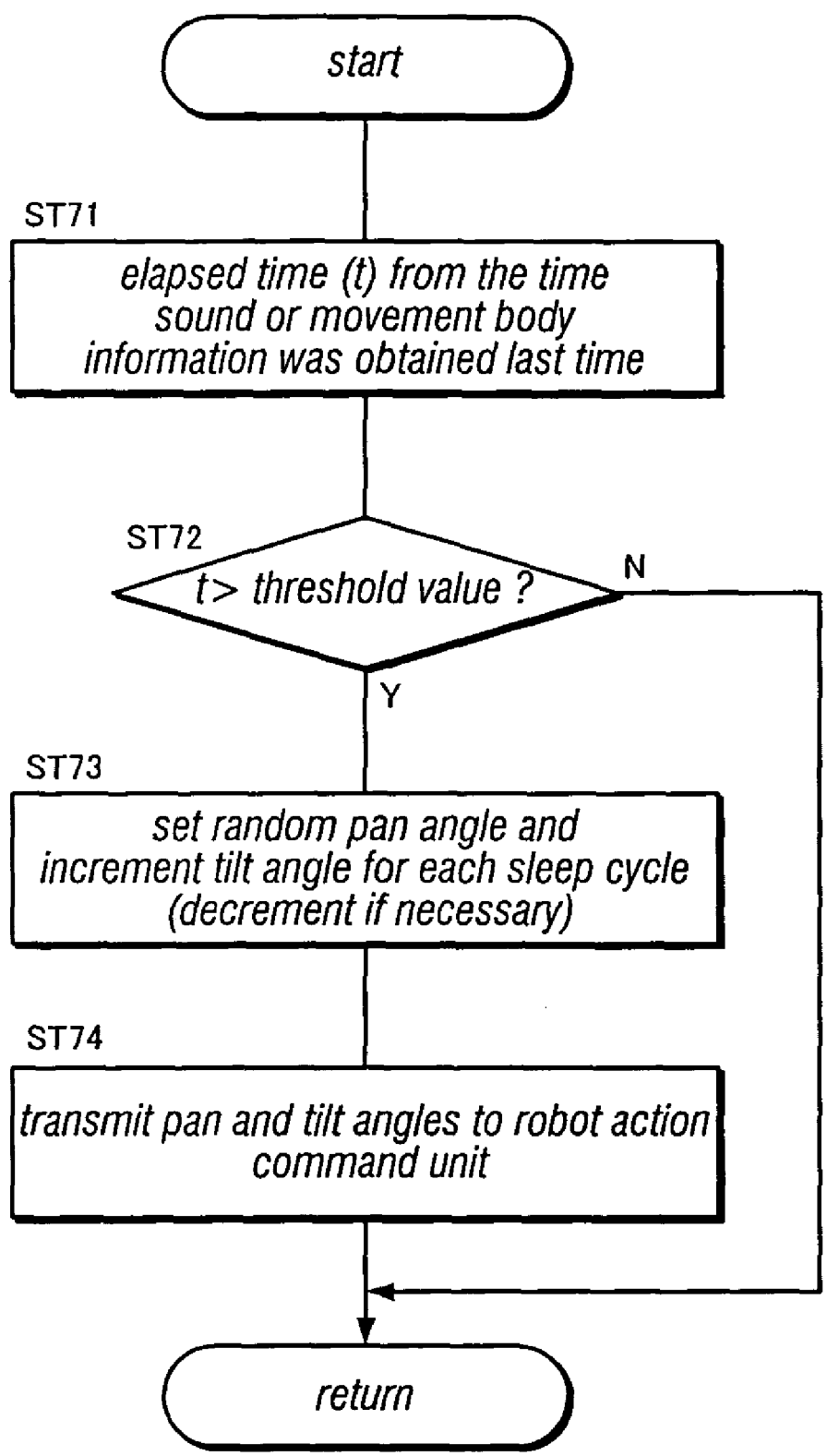
FIG. 6 is a flowchart showing the sleep process.

The mode of controlling various actions of the robot main body 2 is described in the following with reference to the corresponding flowcharts. Each individual control process may be executed as a subroutine. First of all, FIG. 6 shows a sleep process in the response unit. In step ST71, the elapsed time t from the time point at which the information on the sound or moving object was entered for the first time is computed. In step ST72, it is determined if the elapsed time t exceeds a prescribed threshold value. If so, the program flow advances to step ST73. If the elapsed time is below the threshold value, the current routine is concluded. The elapsed time can be computed by storing the time at which the information on the sound or moving object was entered for the first time and using a clock in a subsequent step.

In step ST73, the pan angle of the cameras 11 is randomly set, and the tilt angle of the cameras 11 is incremented upon every cycle of the sleep process. If the tilt angle has reached an upper or lower limit, the tilt angle is then decremented. In step ST74, the set values of the pan angle and tilt angle are transmitted to the action command unit before concluding the current routine. The action command unit actuates the cameras 11 in both lateral and vertical directions via a camera drive unit not shown in the drawing according to these set values.

Figure 7:
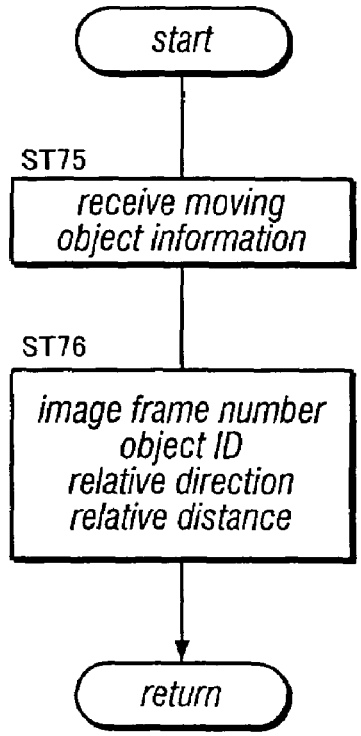
FIG. 7 is a flowchart showing the human information obtaining process.

FIG. 7 shows a human information obtaining process. In step ST75, information on the moving object is obtained from the response unit. In step ST76, the image frame number, moving object ID, relative direction and relative distance are obtained according to the information on the moving object before concluding the current routine.

Figure 8:
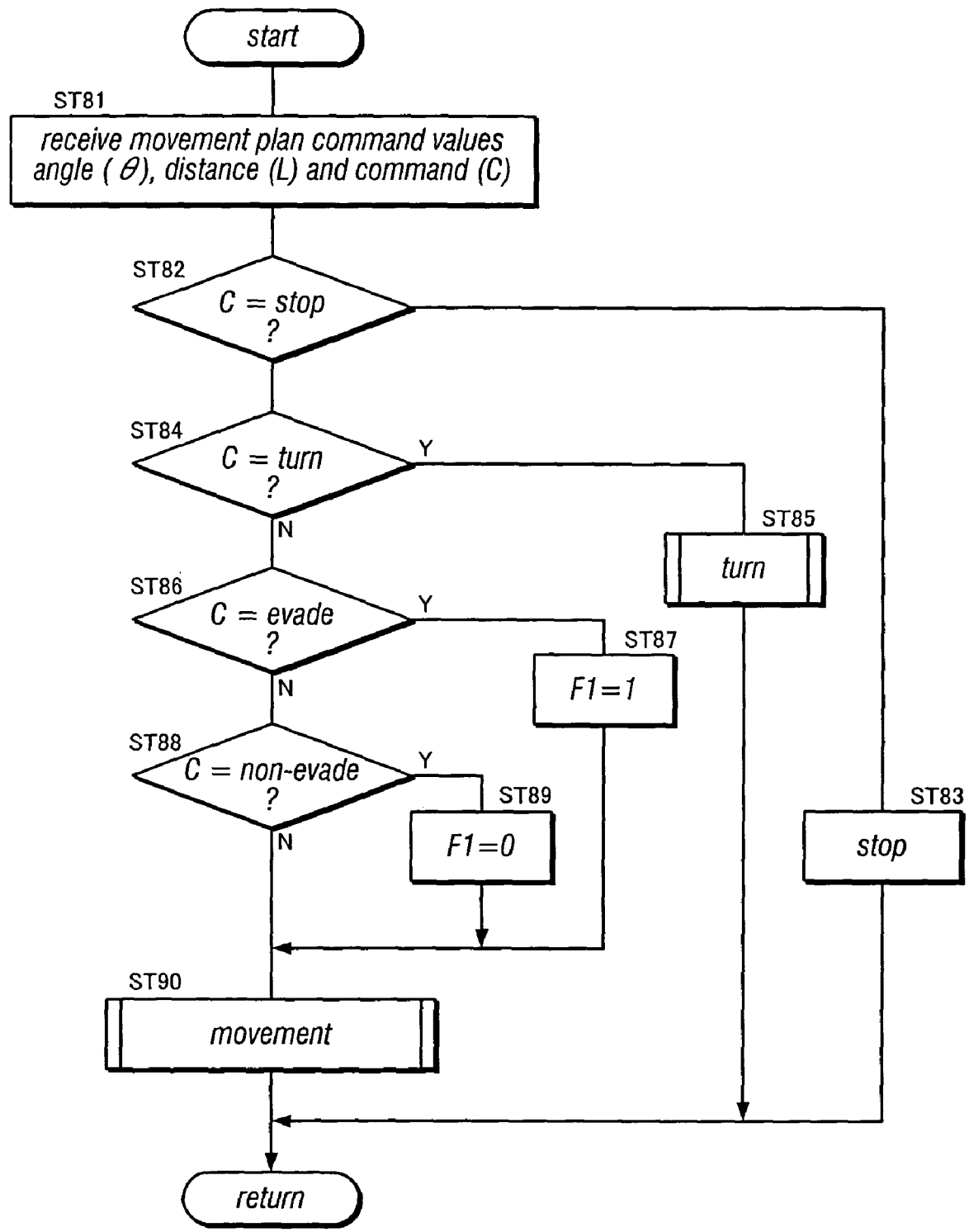
FIG. 8 is a flowchart showing the movement plan command process.

FIG. 8 shows the movement plan command process executed by the movement command unit. In step ST81, the movement command unit obtains movement plan command values from the movement plan unit. The movement plan command values include an angle θ indicating the direction of movement, movement distance and movement command C. In step ST82, it is determined if the received command C indicates "stop". If "stop" is indicated, the program flow advances to step ST83 where a stop process is executed before concluding the current routine. If the command C does not indicate "stop", the program flow advances to step ST84.

In step ST84, it is determined if the command C consists of "turn". If the command C is determined to be consisting of "turn", the program flow advances to step ST85 where a turning process by an angle θ, for instance, is executed before concluding the current routine. If the command C does not consists of "turn", the program flow advances to step ST86. In step ST86, it is determined if the command C consists of "evade". If the command C consists of "evade", the program flow advances to step ST87 where a flag F1 is raised to execute an obstacle evading process (F1=1). If the command C does not consist of "evade", the program flow advances to step ST88 where it is determined if the command C consists of "non-evade". If it is determined in step ST88 that the command C is "non-evade", the program flow advances to step ST89 where the flag F1 is brought back to the original state (F1=0). If the command C does not consist of "non-evade" in step ST88, the program flow advances to step ST90 where a movement process based on the movement plan command values is executed before concluding the current routine. The program flow advances from steps ST87 and ST89 to step ST90 in either case. When it is determined that the flag F1 is raised, the obstacle evading process is executed by conducting a subroutine not shown in the drawing.

Figure 9:
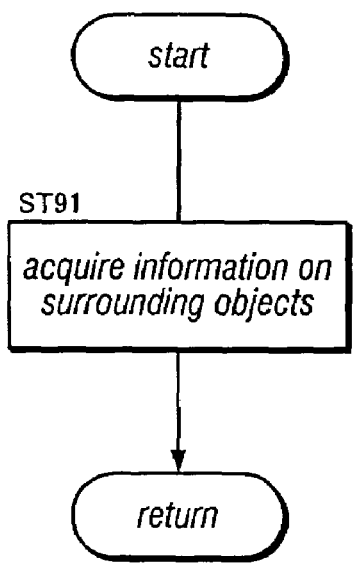
FIG. 9 is a flowchart showing the image information obtaining process.

FIG. 9 shows the image information obtaining process by the response unit. In step ST91, the response unit obtains information on the surrounding objects from the image recognition unit before concluding the current routine.

Figure 10:
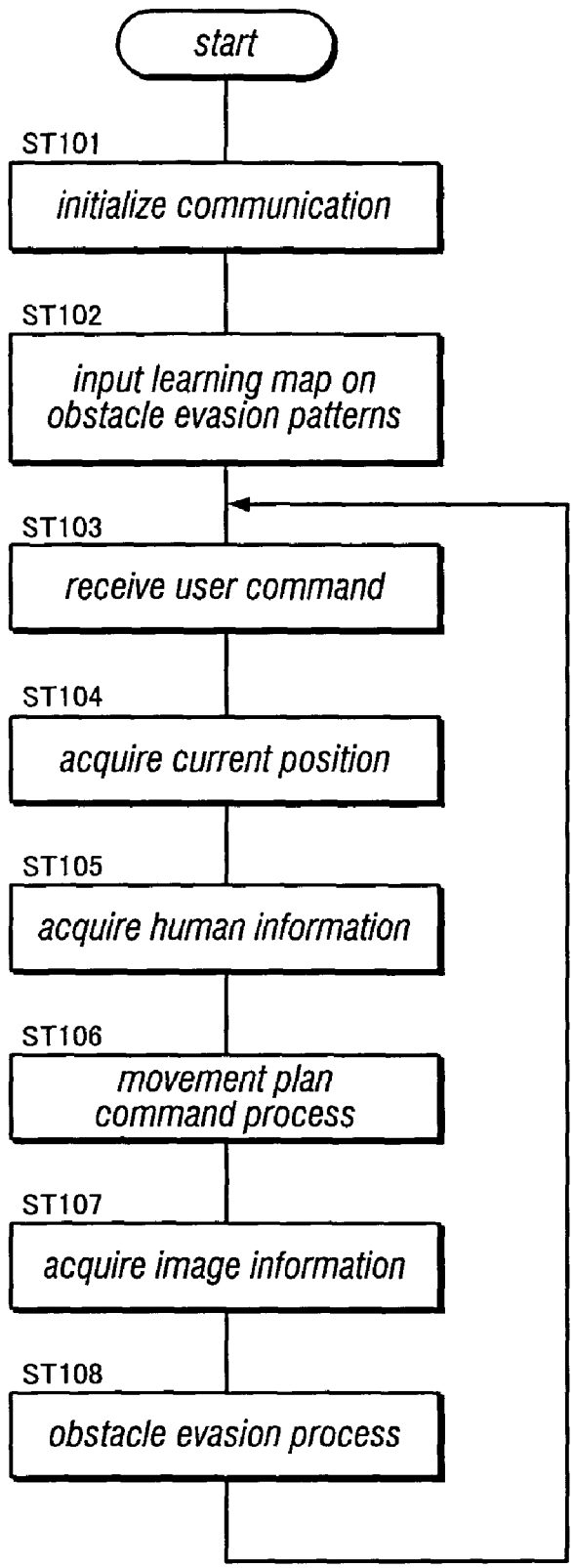
FIG. 10 is a flowchart showing the process by the movement command unit.

FIG. 10 shows the process executed by the movement command unit. First of all, the communication is initialized in step ST101. In step ST102, a learning map for obstacle evasion patterns is entered before the program flow advances to step ST103. A command from the user is received in step ST103, the current position is acquired in step ST104, human information is acquired in step ST105, a movement plan command process is executed in step ST106, image information is acquired in step ST107, and the obstacle evasion process is executed in step ST108 before returning to step ST103 to repeat the foregoing process. The acquiring of the current position is identical to the acquiring of the current position by the movement plan unit.

Figure 11:
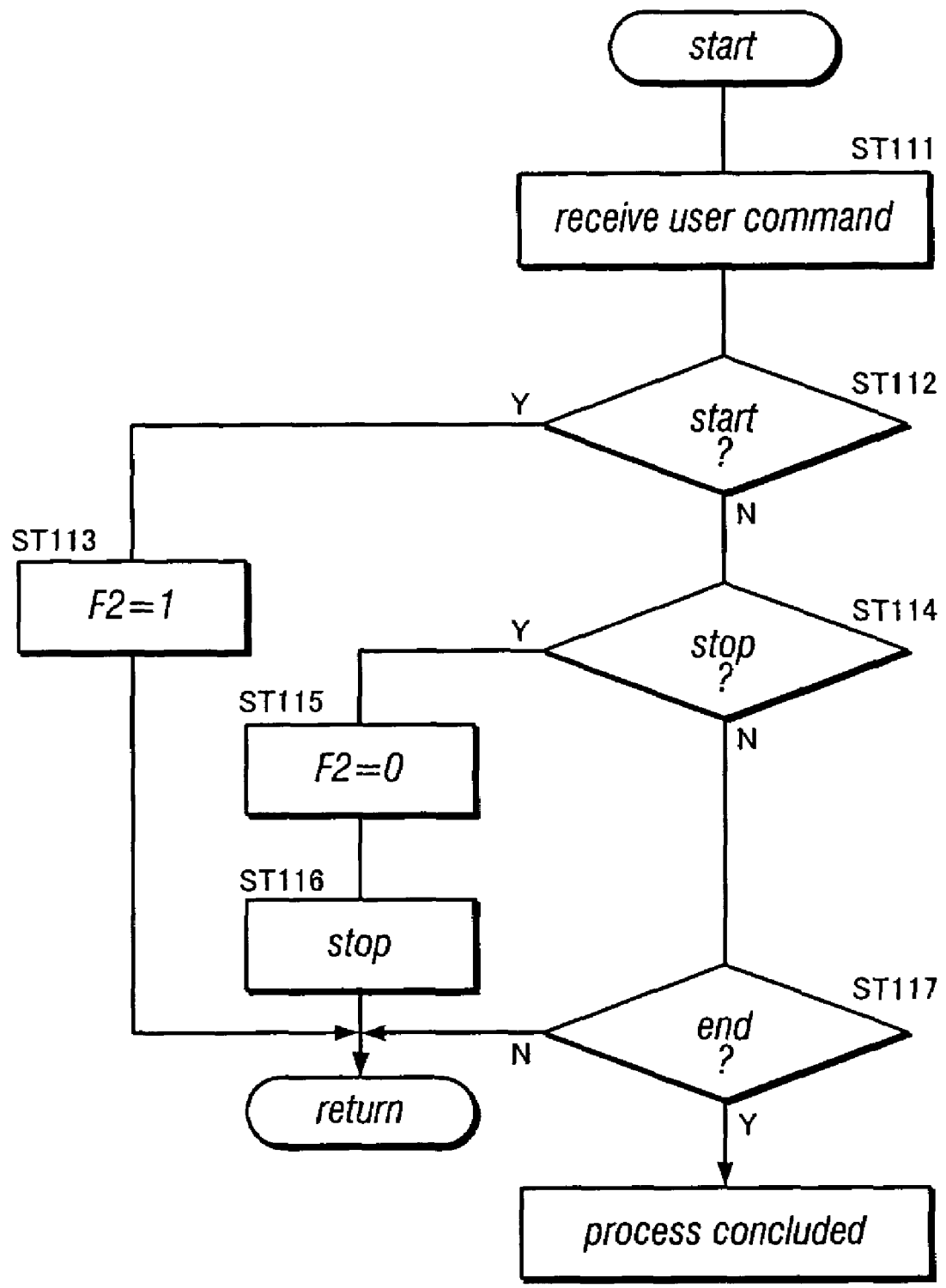
FIG. 11 is a flowchart showing the process of receiving a user command.

FIG. 11 shows the process of receiving a command from the user corresponding to the process of step ST103. In step ST111, an input of a user command is monitored. In the illustrated embodiment, the available user commands consist of "start", "stop" and "end". In step 112, it is determined if "start" is commanded. If "start" is commanded, the program flow advances to step ST113 where a flag F2 is raised (F2=1) before the program flow returns to step ST103. If "start" is not commanded, the program flow advances to step ST114 where it is determined if "stop" is commanded. If "stop" is commanded, the program flow advances to step ST115 where the flag F2 is lowered (F2=0). The program flow then advances to step ST116 where a stop state is produced before the program flow returns to step ST103. If "stop" is not commanded in step ST114, the program flow advances to step ST117 where it is determined if "end" is commanded. If "end" is not commanded, the program flow returns to step ST103. If "end" is commanded, the current routine is concluded.

Figure 12:
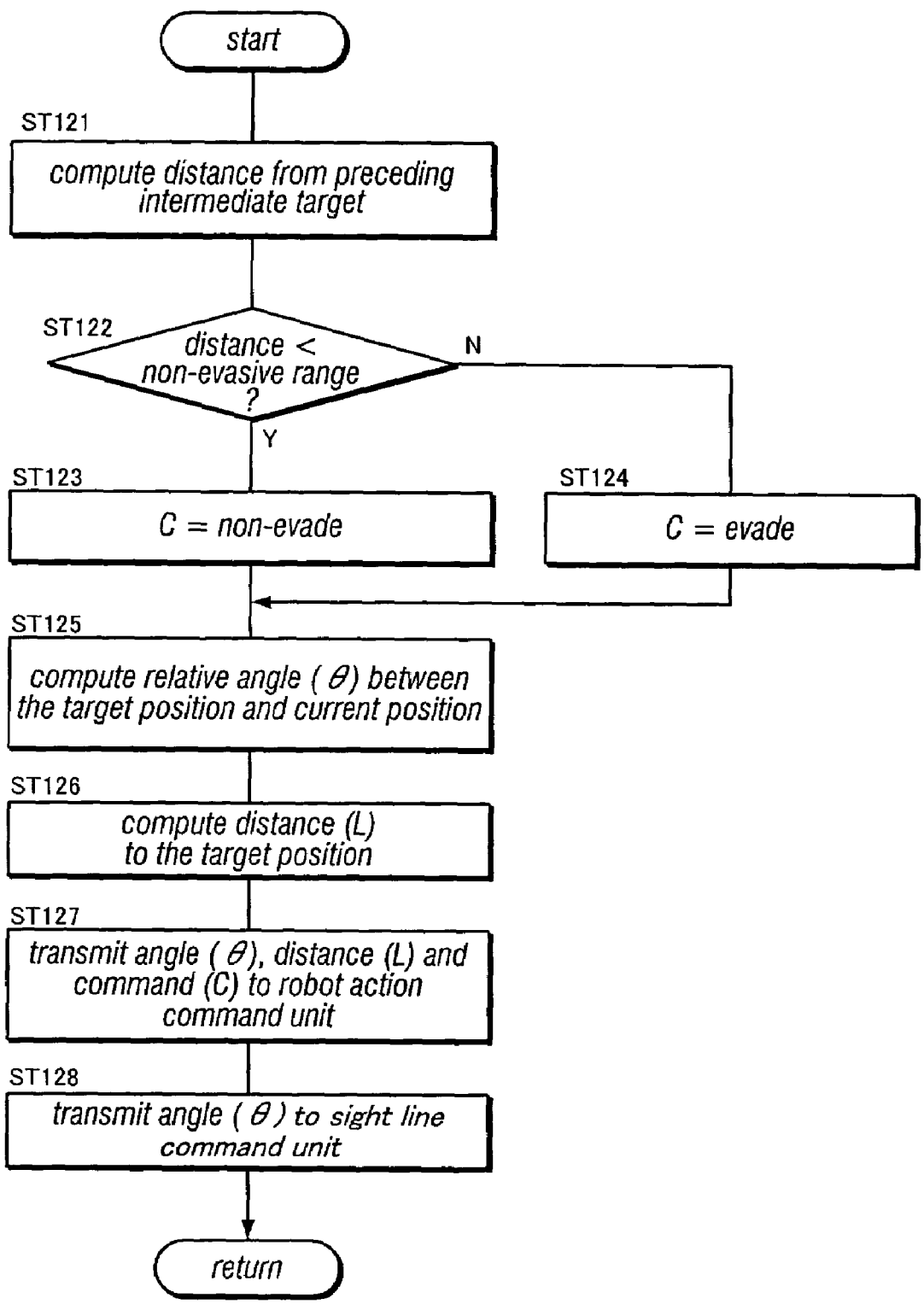
FIG. 12 is a flowchart showing the process of moving the target position.

FIG. 12 shows the process of moving the target position. In the illustrated embodiment, during the course of reaching the final target position, a next intermediate target position relatively adjacent to the current position is defined, and then upon arrival to this intermediate target position another next intermediate target position is defined. This process is repeated until the final target position is reached. In step ST121, the distance L from the previous intermediate target position is determined. In step ST122, it is determined if the distance L is greater than a non-evasive range (range that does not require an evasive action) NR. If the distance L is greater than the non-evasive range, the program flow advances to step ST123 where the command C is turned into "evade". If the distance L is not greater than the non-evasive range, the program flow advances to step ST123 where the command C is turned into "no need to evade". If the distance L is greater than the non-evasive range, the program flow advances to step ST124 where the command C is turned into "evade".

The relative angle θ between the next intermediate target position and current position is computed in step ST125 which follows step ST123 or ST124, the distance L to the next intermediate target position is computed in step ST126, the computed angle θ, distance L and content of the command C are forwarded to the action command unit in step ST127, and the computed angle θ is transmitted to the sight line command unit in step ST128 before concluding the current routine.

Figure 13:
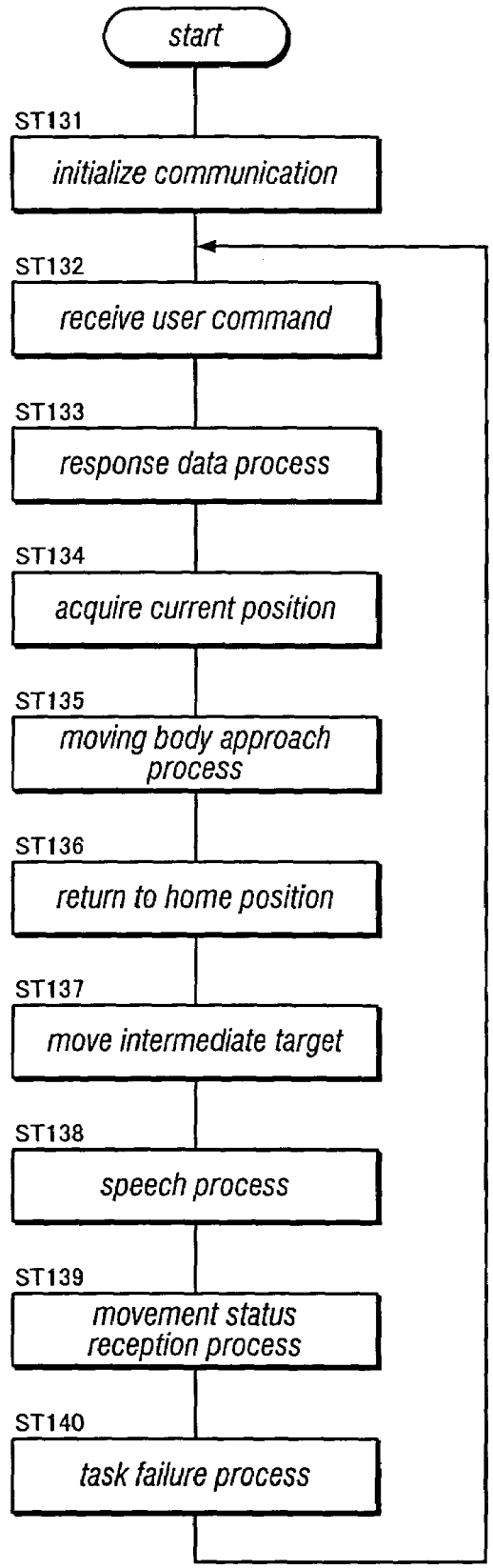
FIG. 13 is a flowchart showing the process by the movement plan unit.

FIG. 13 shows the movement plan process executed by the movement plan unit. The communication is initialized in step ST131, a user command is received in step ST132, and the data is processed by the response process unit in step ST133. This data process typically consists of initializing old data such as temporarily stored values during the course of movement that is not going to be used again.

The current position is acquired in step ST134, a data process for determining an approach of a moving object is executed in step ST135, an original point return process is executed for the purpose of returning to the current home position in step ST136, and a speech process is executed to allow the robot main body 2 to speak to the guest while in motion in step ST138. In step ST139, the movement status of the robot main body 2 (such as a gyro signal) is received, and an associated process is executed. This can prevent the robot main body 2 from falling to the ground by predicting such a possibility and taking an appropriate measure in the case where the robot main body 2 consists of a bipedal robot. A process for the case where the task has failed to be accomplished (such as reporting of the contents of the errors to the robot support server) is executed in step ST140 before the program flow returns to step ST132.

Figure 14:
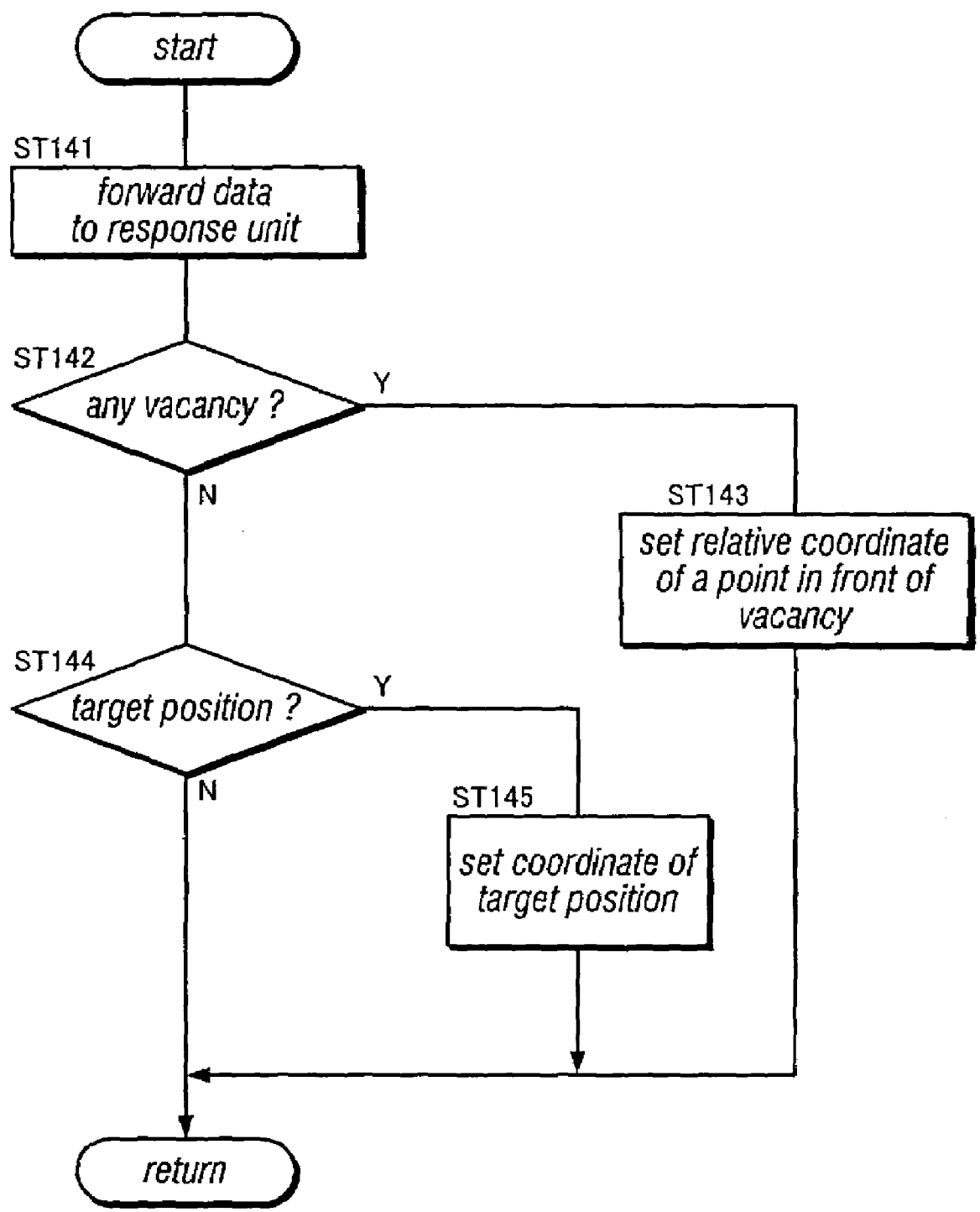
FIG. 14 is a flowchart showing the data processing process by the response unit.

FIG. 14 shows the data process by the response unit. The various data forwarded to the response unit are received and processed appropriately in step ST141, and it is determined in step ST142 if the process associated with the existence of a vacancy in the sofa (the process for conducting the guest 9 to the sofa) is in progress. If the vacancy process is in progress, the program flow advances to step ST143 where the relative coordinate of a position immediately in front of the vacant seat is determined before this routine is concluded. The movement process can be executed according to this coordinate.

If the vacancy process is not in progress in step ST142, the program flow advances to step ST144 where the target position process (the process of setting the position of the guest 9 or home position as the target position) is in progress. If the target position process is in progress, the program flow advances to step ST145 where the coordinate of the target position is determined. If the target position has moved, the coordinate of the new target position is determined.

Thus, according to the foregoing embodiment, by recording the individual personal information of the guests including face images in advance, and having the hosts enter appointments in the database, the robot can look up the individual personal information of the guest simply by recognizing the face of the guest, and can automatically perform the duties of notifying the arrival of the guest to the host and conducting the guest. By designating a meeting place in advance, the traveling robot can refer to a map and conduct the guest to the designated place, and take other necessary and appropriate measures for receiving the guest. If the guest is not recorded in the database, his data can be recorded on the spot, and the updating of the database for receiving guests can be performed in a highly efficient manner. Because the database contains individual personal information that allows the information on the guests and hosts to be retrieved in an efficient manner, the host can be notified of the arrival of the guest without any delay. Also, the database can be updated constantly, and can thereby provide correct information at all times.

The notification to the host can be effected by using any one of a number of terminals including personal computers and mobile telephones, also in a highly efficient manner. Such a notification may include a still image or a motion picture in addition to the name, company and time of visit of the guest so that the host can readily identify the guest. The host which has been notified of the arrival of the guest may send a reply by using a personal computer or mobile telephone, and may even directly send instructions to the robot as a reply. For instance, the host may instruct the robot to "wait in the lobby", "conduct the guest to the meeting place" or "change the contents of the speech".

Although the present invention has been described in terms of a preferred embodiment thereof, it is obvious to a person skilled in the art that various alterations and modifications are possible without departing from the scope of the present invention which is set forth in the appended claims.

The invention claimed is:

1. A receptionist robot system, comprising:
   a traveling robot including autonomous traveling means for traveling autonomously and recognition means for recognizing a guest at least according to image information; and
   management database means adapted to communicate with the robot and provided with a database containing identification information to identify the guest recognized by the recognition means, the management database means being configured to retain and update individual personal information and schedule information for identifying the guest;
   wherein the guest is identified at least according to information obtained by the recognition means and management database means;
   wherein the traveling robot further comprises dialog means for communicating with the guest recognized by the recognition means and response means for determining the contents of communication with the guest according to an identity of the guest recognized by the recognition means and associated information from the management database means; and wherein the response means is configured to determine an action to conduct the guest to a prescribed facility according to the utilization status of the facility.

2. A receptionist robot system according to claim 1, wherein the management database means is adapted to retain and update individual personal information and schedule information.

3. A receptionist robot system according to claim 2, wherein the management database means searches for an appointment of the identified guest by referring to the schedule information, and the traveling robot further comprises response means for determining an action to conduct the guest according to the search result of the management database means.

4. A receptionist robot system according to claim 2, wherein the recognition means is adapted to select a candidate or determine a priority order of a plurality of candidates according to the schedule information of the management database means.

5. A receptionist robot system according to claim 2, wherein the management database means is adapted to update the individual personal information according to a result of communication with the guest conducted by the response means.

6. A receptionist robot system according to claim 1, wherein the traveling robot further comprises response means for determining an action to be executed depending on a particular condition by referring to a scenario table which defines various actions of the traveling robot and an individual personal map that manages human information surrounding the traveling robot.

7. A receptionist robot system according to claim 1, wherein the recognition means comprises a camera.

8. A receptionist robot system according to claim 1, wherein the recognition means comprises stereoscopic cameras.

9. A receptionist robot system according to claim 1, wherein the recognition means comprises a microphone.

10. A receptionist robot system according to claim 1, wherein the recognition means comprises stereophonic microphones.

11. A receptionist robot system, comprising:
a traveling robot adapted to travel autonomously; and
management database means adapted to communicate with the robot and provided with a database adapted to retain and update individual personal information and schedule information for identifying a guest,
wherein the traveling robot comprises recognition means for recognizing the guest at least according to image information, and response means for determining an action to conduct the guest recognized by the recognition means,
wherein the management database means is communicably connected with input means for inputting the schedule information and notification means for notifying the arrival of the guest to a host according to the action of the response means with respect to the guest,
wherein the traveling robot further comprises dialog means for communicating with the guest recognized by the recognition means and response means for determining the contents of communication with the guest according to an identity of the guest recognized by the recognition means and associated information from the management database means, and
wherein the response means is configured to determine an action to conduct the guest to a prescribed facility according to the utilization status of the facility.

12. A receptionist robot system according to claim 11, wherein the recognition means is adapted to forward a recognition result to the management database means, and the management database means is adapted to update the individual personal information according to the forwarded recognition result.

13. A receptionist robot system according to claim 11, wherein the management database means comprises map information including at least a position of a stairway, and the traveling robot is capable of traveling inside a building including a stairway according to the map information.

14. A receptionist robot system according to claim 11, wherein the management database means is adapted to retain and update a utilization status of a facility located within a traveling range of the robot.

15. A receptionist robot system according to claim 11, wherein the recognition means detects the guest as a moving object and when it is determined that the guest has approached to a prescribed distance, detects a face of the guest to identify the guest by using the detected face.

16. A receptionist robot system according to claim 11, wherein the management database means is adapted to retain and update the individual personal information of the guest.

17. A receptionist robot system according to claim 11, wherein the management database means or robot is provided with an answer-back function in connection with the notification means.

18. A receptionist robot system according to claim 11, wherein the recognition means comprises a camera.

19. A receptionist robot system according to claim 11, wherein the recognition means comprises stereoscopic cameras.

20. A receptionist robot system according to claim 11, wherein the recognition means comprises a microphone.

21. A receptionist robot system according to claim 11, wherein the recognition means comprises stereophonic microphones.

22. A receptionist robot system according to claim 11, wherein the traveling robot further comprises response means for determining an action to be executed depending on a particular condition by referring to a scenario table which defines various actions of the traveling robot and an individual personal map that manages human information surrounding the traveling robot.

23. A receptionist robot system according to claim 11, wherein the management database means searches for an appointment of the identified guest by referring to the schedule information, and the response means for determining an action to conduct the guest determines the action according to the search result of the management database means.

* * * * *